United States Patent
Bansi et al.

(10) Patent No.: US 10,376,793 B2
(45) Date of Patent: *Aug. 13, 2019

(54) VIDEOGAME SYSTEM AND METHOD THAT ENABLES CHARACTERS TO EARN VIRTUAL FANS BY COMPLETING SECONDARY OBJECTIVES

(71) Applicant: Activision Publishing, Inc., Santa Monica, CA (US)

(72) Inventors: Charnjit Singh Bansi, Chesire (GB); Paul Kerby, Liverpool (GB); Peter Hall, Liverpool (GB); Gareth Wilson, Cheshire (GB)

(73) Assignee: Activision Publishing, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,801

(22) Filed: Aug. 22, 2017

(65) Prior Publication Data

US 2018/0126286 A1 May 10, 2018

Related U.S. Application Data

(63) Continuation of application No. 14/961,220, filed on Dec. 7, 2015, now Pat. No. 9,764,244, which is a
(Continued)

(51) Int. Cl.
*A63F 13/85* (2014.01)
*A63F 13/5375* (2014.01)
(Continued)

(52) U.S. Cl.
CPC ............ *A63F 13/85* (2014.09); *A63F 13/10* (2013.01); *A63F 13/30* (2014.09); *A63F 13/44* (2014.09);
(Continued)

(58) Field of Classification Search
CPC ...... A63F 13/10; A63F 13/85; A63F 13/5375; A63F 13/46; A63F 13/30; A63F 13/79;
(Continued)

(56) References Cited

U.S. PATENT DOCUMENTS

| 4,461,301 A | 7/1984 | Ochs |
| 4,908,761 A | 3/1990 | Tai |

(Continued)

FOREIGN PATENT DOCUMENTS

| AU | 768367 | 3/2004 |
| AU | 2005215048 | 10/2011 |

(Continued)

OTHER PUBLICATIONS

Notice of Allowance dated May 23, 2017 for U.S. Appl. No. 14/961,220.
(Continued)

*Primary Examiner* — Robert T Clarke, Jr.
*Assistant Examiner* — Thomas H Henry
(74) *Attorney, Agent, or Firm* — Novel IP

(57) ABSTRACT

A videogame may be provided to one or more users in which characters controlled by users earn fans that impact the videogame similarly to fans in real life. For example, a character may earn virtual currency, be invited to participate in events and/or teams, obtain sponsorships, and/or experience other impacts associated with fanbase size. The videogame may include one or more primary objectives presented to the user. The performance of the primary objectives by the user may impact the progression of a character being controlled by the user through the videogame. The videogame may further include provide one or more fan objectives within the game which can be per-
(Continued)

formed by the character being controlled by the user to earn fans to be included within a fanbase associated with the character in the game

22 Claims, 7 Drawing Sheets

Related U.S. Application Data continuation of application No. 12/707,984, filed on Feb. 18, 2010, now Pat. No. 9,205,328.

(51) Int. Cl.
*A63F 13/46* (2014.01)
*A63F 13/30* (2014.01)
*A63F 13/79* (2014.01)
*A63F 13/803* (2014.01)
*A63F 13/44* (2014.01)
*A63F 13/40* (2014.01)

(52) U.S. Cl.
CPC .......... *A63F 13/46* (2014.09); *A63F 13/5375* (2014.09); *A63F 13/79* (2014.09); *A63F 13/803* (2014.09); *A63F 2300/575* (2013.01); *A63F 2300/61* (2013.01); *A63F 2300/638* (2013.01); *A63F 2300/8017* (2013.01)

(58) Field of Classification Search
CPC .. A63F 13/803; A63F 13/44; A63F 2300/575; A63F 2300/8017; A63F 2300/61; A63F 2300/638
See application file for complete search history.

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |

(56) References Cited

U.S. PATENT DOCUMENTS

| | | |
|---|---|---|
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,763,273 B2 | 7/2004 | Chudley |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,617,283 B2 | 11/2009 | Aaron |
| 7,640,587 B2 | 12/2009 | Fox |
| 7,667,701 B2 | 2/2010 | Leah |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,847,799 B2 | 12/2010 | Taubin |

(56) References Cited

U.S. PATENT DOCUMENTS

| | | |
|---|---|---|
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2001/0032240 A1 | 10/2001 | Malone |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |

(56) References Cited

U.S. PATENT DOCUMENTS

| | | |
|---|---|---|
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0091380 A1 | 4/2005 | Gonen |
| 2005/0097440 A1 | 5/2005 | Lusk |
| 2005/0132009 A1 | 6/2005 | Solie |
| 2005/0138108 A1 | 6/2005 | Galvin |
| 2005/0149620 A1 | 7/2005 | Kirkland |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2007/0026934 A1 | 2/2007 | Herbrich |
| 2007/0066403 A1 | 3/2007 | Conkwright |
| 2007/0073582 A1 | 3/2007 | Jung |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0130001 A1 | 6/2007 | Jung |
| 2007/0168444 A1 | 7/2007 | Chen |
| 2007/0168447 A1 | 7/2007 | Chen |
| 2007/0180040 A1 | 8/2007 | Etgen |
| 2007/0265718 A1 | 11/2007 | Graepel |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0076527 A1 | 3/2008 | Low |
| 2008/0096623 A1* | 4/2008 | Fujii .................. A63F 13/10 463/6 |
| 2008/0113815 A1 | 5/2008 | Weingardt |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0113448 A1 | 4/2009 | Smith |
| 2009/0137320 A1 | 5/2009 | Kimura |
| 2009/0253494 A1 | 10/2009 | Fitch |
| 2009/0325711 A1 | 12/2009 | Bronstein |
| 2010/0306672 A1 | 12/2010 | McEniry |
| 2011/0190063 A1 | 8/2011 | Kajii |
| 2011/0201395 A1 | 8/2011 | Bansi |
| 2012/0021825 A1 | 1/2012 | Harp |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0162763 A1 | 6/2014 | Kim |
| 2014/0162781 A1 | 6/2014 | Butler |
| 2014/0344725 A1 | 11/2014 | Bates |
| 2014/0349753 A1 | 11/2014 | Imai |
| 2015/0038233 A1 | 2/2015 | Rom |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0191671 A1 | 6/2016 | Dawson |
| 2016/0296840 A1 | 10/2016 | Kaewell |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |

(56) References Cited

FOREIGN PATENT DOCUMENTS

| | | |
|---|---|---|
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS www.hattrick.org rules section Jul. 1, 2009.
Office Action dated Jan. 6, 2012 for U.S. Appl. No. 12/707,984.
Office Action dated Jul. 24, 2013 for U.S. Appl. No. 12/707,984.
Office Action dated Mar. 13, 2014 for U.S. Appl. No. 12/707,984.
Office Action dated Dec. 19, 2014 for U.S. Appl. No. 12/707,984.
Notice of Allowance dated Sep. 17, 2015 for U.S. Appl. No. 12/707,984.
Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.
Office Action dated Mar. 24, 2017 for U.S. Appl. No. 14/712,514.
Office Action dated Jan. 20, 2017 for U.S. Appl. No. 14/712,566.
Notice of Allowance dated Jun. 14, 2017 for U.S. Appl. No. 14/712,566; (pp. 1-9).
Office Action dated Feb. 13, 2017 for U.S. Appl. No. 14/712,541.
Office Action dated Aug. 7, 2017 for U.S. Appl. No. 14/712,541; (pp. 1-16).
Office Action dated Oct. 19, 2017 for U.S. Appl. No. 14/712,514; (pp. 1-12).
Office Action dated Mar. 14, 2018 for U.S. Appl. No. 14/712,541 (pp. 1-16).
Office Action dated Mar. 14, 2018 for U.S. Appl. No. 15/703,757.

(56) References Cited

OTHER PUBLICATIONS

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

V. Stojanovic, "Virtual boutique—try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol.2.

Roaming Virtual World Is a Real Trip; [Final Edition] Leslie Walker. The Washington Post. Washington, D.C.: Mar. 30, 2006.

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Kautz, H., B. Selman, M. Shah.. "Referral Web: Combining Social Networks and Collaborative Filtering". Communications of the ACM, vol. 40, No. 3, Mar. 1997.

Schwartz, M. F., D. C. M. Wood. "Discovering shared interests among people using graph analysis of global electronic mail traffic". Department of Computer Science, University of Colorado, Boulder CO. Oct. 1992.

Wellman, B. "For a social network analysis of computer networks: a sociological perspective on collaborative work and virtual community". Proceedings of the 1996 conference on ACM SIGCPR/SIGMIS. 1-11.

Qureshi, S. "Supporting electronic group processes: a social perspective". Proceedings of the 1995 ACM SIGCPR Conference on Supporting teams, groups, and learning inside the IS function. ACM Press. 24-34.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Garton, L., C. Haythornthwaite, B. Wellman. "Studying on-line social networks in Doing Internet Research", Jun. 1997.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Feldman, R. "Mining unstructured data". Tutorial notes for ACK SIGKDD 1999. ACM Press. 182-236.

"Universally Unique Identifier", 2006 (http://en.wikipedia.org/wiki/UUID).

Office Action dated May 24, 2018 for U.S. Appl. No. 14/712,359 (pp. 1-20).

\* cited by examiner

VIDEOGAME SYSTEM AND METHOD THAT ENABLES CHARACTERS TO EARN VIRTUAL FANS BY COMPLETING SECONDARY OBJECTIVES

CROSS-REFERENCE TO RELATED APPLICATIONS

This application is a continuation application of U.S. patent application Ser. No. 14/961,220, entitled "Videogame System and Method that Enables Characters to Earn Virtual Fans by Completing Secondary Objectives" and filed on Dec. 7, 2015, which is a continuation application of U.S. patent application Ser. No. 12/707,984, of the same title, filed on Feb. 18, 2010, and issued as U.S. Pat. No. 9,205,328 on Dec. 8, 2015, the contents of both are hereby incorporated herein by reference in their entirety.

FIELD OF THE INVENTION

The invention relates to providing a videogame in which users can control characters to perform secondary objectives in order to earn fans. The fans in the fanbase of a given character may impact the given character within the videogame in ways that mimic the impacts of fanbases of real people in real life.

BACKGROUND OF THE INVENTION

Typically in videogames, users control a character to perform a series of tasks or objectives. Based on the performance of the character within these objectives, the character may advance through the videogame. In some videogames, views of the objectives and/or other scenes may be rendered including spectators or fans that observe the objectives. Generally, the fans supporting a given character are static within the game (e.g., fanbases do not swell or shrink based on character performance). Further, other than appearing in the views, the fans do not impact the arch of the characters within the videogame.

SUMMARY

One aspect of the invention relates to providing a videogame to one or more users in which characters controlled by users earn fans that impact the videogame similarly to fans in real life. For example, a character may earn virtual currency, be invited to participate in events and/or teams, obtain sponsorships, and/or experience other impacts associated with fanbase size. The videogame may include one or more primary objectives presented to the user. The performance of the primary objectives by the user may impact the progression of a character being controlled by the user through the videogame. The videogame may further include provide one or more fan objectives within the game which can be performed by the character being controlled by the user to earn fans to be included within a fanbase associated with the character in the game.

A system configured to provide the videogame may include a game console, such as Xbox 360® game console, the PlayStation3® game console, the Wii® game console, and/or other game consoles. This is not intended to be limiting. In some implementations, the system may include one or more other consumer computing platforms, such as, a desktop computer, a laptop computer, a handheld computer, a personal gaming device, a NetBook, a SmartPhone, and/or other computing platforms.

The system may include one or more processors may be configured to execute computer program modules. The computer program modules may include one or more a primary objective staging module, a primary objective evaluation module, a fan objective staging module, a fan objective trigger module, a fan objective evaluation module, a fanbase module, a fanbase impact module, and/or other modules. The one or more processors may be configured to execute the modules by software; hardware; firmware; some combination of software, hardware, and/or firmware; and/or other mechanisms for configuring processing capabilities on the one or more processors.

The primary objective staging module may be configured to stage a primary objective within the videogame. This may include staging an event including the primary objective. By way of non-limiting example, an event having a primary objective may include one or more of a race, a puzzle, a fight, a battle, a contest, and/or other events involving primary objectives. In implementations in which the videogame includes a racing game, the primary objective staging module may be configured to stage races in which vehicles are raced through a virtual racecourse. Staging a race may include rendering views of the racecourse that include the vehicles participating in the race. The rendered views may depict the vehicle controlled by a character controlled by a user using controller as the vehicle travels through the racecourse.

The primary objective evaluation module may be configured to evaluate the performance of the character in executing the primary objective. In a race staged by the primary objective staging module, the primary objective may include finishing the race, finishing at or above a predetermined place in the race, minimizing the amount of time spent finishing the race, beating one or more predetermined opponents, and/or other objectives. The primary objective evaluation module may be configured to monitor the character during the race to determine whether the character has completed the primary objective and/or to evaluate the performance of the character during the race. In implementations in which the videogame is not a racing game, and the primary objective staging module stages a primary objective that is not a race, the primary objective evaluation module may monitor the character's performance of other types of primary objectives to evaluate performance.

The fan objective staging module may be configured to stage a plurality of fan objectives that are selectably performable by the character during a given primary objective (e.g., a race) staged by the primary objective staging module. Fan objectives may be secondary objectives that can be performed during performance of a primary objective. Performance of a fan objective by the character may result in the character earning fans within the videogame to be included in the character's fanbase. The fans may include virtual fans and/or real life fans.

Staging a fan objective may include presenting the fan objective for performance. This may include inserting a fan objective icon into views of a primary objective rendered by the primary objective staging module, and associating a fan objective with the fan objective icon. The fan objective icon may give some indication of what the associated fan objective entails, or the fan objective icon may be generic between fan objectives. The fan objective associated with a fan objective icon may include one or more of a point-to-point objective, a maneuver objective, a pickup objective, a racer interaction objective, a damage objective, and/or other objectives.

A point-to-point objective may involve controlling the vehicle to travel from a beginning location to one or more other designated locations. The beginning location may be the location at which the fan objective icon is located within the views of the videogame. The other designated locations may include locations that are specially marked, specific locations that are specifically described to the user (e.g., drive under a crane), locations that satisfy some criteria provided to the user (e.g., flat ground, outside of a building, and/or other criteria), and/or other locations. The designated location may be fixed, or may be moving (e.g., drive through a break in a moving set of objects, hit a moving object, and/or other moving locations).

A maneuver objective may involve performing one or more specified maneuver(s) with the vehicle. By way of non-limiting example, the one or more specified maneuvers may include one or more of a jump, a nitro jump, a drifted corner, a powerslide, jumping a designated object or location, jumping to a designated object or location, passing one or more other vehicles, attaining a specified speed, performing a corner or jump with an evaluated level of efficiency and/or effectiveness, and/or other maneuvers.

A pickup objective may involve driving over or near one or more specified "pickups." The one or more "pickups" may be specified by type, by location and/or both. As used herein, the term "pickup" may include a power, resource, or advantage that is obtained by the character when the vehicle drives over or near an icon associated with the power, resource, and/or advantage.

A racer interaction objective may involve effectively interacting with one or more other racers in a predetermined manner. For example, a racer interaction objective may include using a pickup to harm and/or help one or more other racers. As another example, a racer interaction objective may include crashing into one or more other racers, causing one or more other racers to crash, and/or otherwise interacting with other racers during a race.

A damage objective may involve causing predetermined damage. The damage may be to one or more inanimate objects on or near the racecourse, one or more other racers, and/or other objects on or near the racecourse.

It will be appreciated that this is not intended to be an exhaustive list of the types of fan objectives that may be implemented. Other types are contemplated. In some instances, a given fan objective may be a hybrid of two or more types of fan objective. For example, the given fan objective may specify a type of pickup to be made during a specified type of maneuver (e.g., a jump).

Performance or non-performance of fan objectives during performance of a primary objective may not directly impact the performance of the primary objective by the primary character. For example, controlling the vehicle to perform a fan objective may not directly impact the relative position or speed of the vehicle in the race. Any gain (or loss) in, for instance, speed and/or position, may include only the same gain (or loss) that would have occurred if the actions performed by the vehicle had not been an attempt to satisfy a fan objective. As such, fan objectives may be peripheral, or parallel, to the primary objective in which they are staged.

The fan objectives staged by the fan objective staging module may be graduated according to difficulty. For example, the fan objectives may include a first set of fan objectives, a second set of fan objectives, and/or a third set of an objectives that are of an increasing difficulty level (e.g., the first set is easiest, the third set is hardest). The fan objective staging module may be configured such that not every character will be presented with all of the fan objectives during a given primary objective. Some of the fan objectives may be left out of the given primary objective because they are too hard and/or too easy of the character. Determinations of whether to leave fan objectives out of the given primary objective may be made based on, for example, a difficulty setting for the videogame as a whole selected by the user associated with the character.

The fan objective trigger module may be configured to trigger activation of fan objectives. Activation of fan objectives may be triggered based on performance of one or more triggering maneuvers by a character. For example, in a racing videogame, a triggering maneuver may include maneuvering a vehicle associated with the character over or through a fan objective icon.

Once a fan objective is activated by the fan objective trigger module, the fan objective may remain active until it is completed, until a time period associated with the fan objective runs out, and/or until some other event. At activation of the fan objective, information about the fan objective may be conveyed to the user controlling the character. This may include providing such information to the user via the views of the racecourse. A view of the racecourse (or some other primary objective) may include a description of the fan objective is presented to the user. The description may include text, figures that illustrate the objective, and/or other forms of description.

While a first fan objective is active, the character (and/or the vehicle associated with the character) may perform a triggering maneuver associated with a second fan objective. The triggering maneuver associated with the second fan objective may result in the activation of the second fan objective.

There may be a maximum number of currently activated fan objectives. In such instances, performance of a triggering maneuver when the fan objective trigger module has already triggered activation of the maximum number of currently activated fan objectives may result in the fan objective associated with the triggering maneuver not being triggered. In some instances, performance of a triggering maneuver when the fan objective module has already triggered activation of the maximum number of currently activated fan objectives may result in one of the previously activated fan objectives being expired so that the fan objective associated with the triggering maneuver can be triggered by the fan objective trigger module. In some instances, performance of a triggering maneuver when the fan objective trigger module has already triggered activation of another fan objective may result in the fans associated with performance one of the triggered fan objectives being transferred to the other fan objective.

The manner in which multiple triggered fan objectives are handled may be based in part on the difficulty level of the triggered fan objectives. For example, a newly triggered fan objective having a relatively high difficulty level may result in the expiration of a previously triggered fan objective with a relatively low difficulty level and activation of the newly triggered fan objective. As another example, a newly triggered fan objective having a relatively low difficulty level may result in the fans associated with performance of the newly triggered fan objective being transferred to a previously triggered fan objective such that performance of the previously triggered fan objective results in the character being awarded with the fans associated with both of the triggered fan objectives.

The fan objective evaluation module may be configured to evaluate the performance of the fan objectives by the character. This may include monitoring performance of the fan objectives by the character. Upon completion of a fan objective by the character, the fan objective evaluation module may determine the fans earned by the character by virtue of the completed fan objective. The fans earned by the character may have been previously assigned to the fan objective, and/or the fans earned by the character may be determined by the fan objective evaluation module based on the performance of the character in completing the fan objective.

In some implementations, the fan objective evaluation module determines an amount of fans earned by the character by virtue of a completed fan objective based on an amount of time that the completed fan was active (e.g., between triggering and completion). The amount of fans earned by the character may be inversely proportional to the amount of time that the completed fan objective was active.

The fan objective evaluation module may be configured to provide feedback to the user controlling the character that indicates to the user an amount of fans that could be earned by completing the fan objectives. For example, an indication of the amount of fans presently associated with the active fan objective may be presented to the user in views of the primary objective. The amount of fans associated with the fan objective may decay as time passes. Thus, the longer it takes for the vehicle being controlled to complete the fan objective, the fewer the number of fans that will be earned. The decay of the amount of fans associated with the fan objective may begin immediately upon triggering of the fan objective, or the decay may be delayed by a delay period. The rate at which the amount of fans associated with the fan objective decays may be constant with respect to time, or may accelerate or decelerate as time goes on. The delay period and/or the decay rate may be determined based on a level of difficulty of the fan objective.

The fan objective evaluation module may be configured such that after a predetermined period of time from triggering of a fan objective, the fan objective expires. Upon expiration of the fan objective, performance of the fan objective by the character may no longer result in an award of fans to the character. The predetermined period of time may be based on a level of difficulty of the triggered fan objective.

The fanbase module may be configured to determine the fans in the fanbase of a character in the videogame. The fanbase module may determine the fans in the fanbase of the character based on determinations of fan awards by the fan objective evaluation module. For example, the fanbase module may determine an amount of fans in the fanbase by adding a new award of fans to the fans previously acquired by the character.

In some implementations, the fanbase module may be configured such that fans can be lost by the character. Fans may be lost over time, stolen by other characters, and/or otherwise lost. For example, if the character is not active in participating in primary objectives, attempting to earn new fans through the performance of fan objectives, and/or otherwise inactive and/or unsuccessful within the game, the interest of fans may be lost and the amount of fans in the fanbase of the character may begin to decay. This decay may be determined according to a predetermined scheme that rewards a user controlling the character to maintain a certain level of activity and/or success within the videogame.

In some cases, the fanbase module may be configured such that fans may be stolen from the character by other characters (e.g., and vice versa). For example, if the character is outperformed by another one of the characters in a primary objective and/or a fan objective by a predetermined amount, the other character may steal some of the fans of the character. As another example, the videogame may be configured such that one character can challenge another character (or set of characters) to perform a competitive challenge objective. Fans may be exchanged between the characters that participate in the competitive challenge objective based on their relative performances in the competitive challenge objective. The number of fans that are exchanged (e.g., stolen from one character by another) may be based on a predetermined scheme, based on the difference between the performances of the participating characters (e.g., a close loss would result in fewer fans switching than a contest that was not close), based on an agreement between the participating characters (e.g., a wager of fans), and/or otherwise determined.

The fanbase module may be configured to track the fanbases of various characters relative to each other. For example, the fanbase module may maintain a leaderboard or ranking of characters associated with different users that is based on the relative amounts of fans in the fanbases of the different characters. Such leaderboards and/or rankings may further be maintained for amounts of fans earned in specific primary objectives and/or sets of primary objectives.

The fanbase impact module may be configured to determine the impact of the fanbase of a character on the arch of the character within the videogame. The fanbase impact module may determine this impact based on the amount of fans in the fanbase of the character, and/or other aspects of the fanbase. The fanbase impact module may be configured such that the fans in the fanbase of the character may be similar to the impact of fanbases in the real world. For example, opportunities to participate in primary objectives, distribution of virtual currency, relationships with other characters and/or entities within the videogame, sponsorship opportunities, and/or other aspects of the videogame may be impacted by the number of fans in the fan base of the character.

The staging of primary objectives by the primary objective staging module may include determining whether the character should be invited to participate in a given primary objective. In real life, the number of fans in a fanbase of a racer may impact the opportunities to race received by the racer. The more popular the racer is, the more races he may be asked to participate in, and the more prestigious the races may be. In a racing videogame, the fanbase impact module may be configured to mimic this impact of a fanbase such that in staging races, the primary objective staging module may extend, or not extend, invitations to race to the character based on the amount of fans (and/or other characteristics of the fans) in the fanbase of the character.

In real life, the popularity associated with having a relatively large fanbase may enable someone to earn additional money. For example, a popular participant in events may earn appearance fees for participation, may gain entrée to events in which prize money is relatively high, and/or may otherwise leverage their popularity to earn additional money. The fanbase impact module may be configured to mimic this impact in the videogame. For example, the system may include a virtual currency module configured to distribute virtual currency to the character. The fanbase impact module may be configured to cause the virtual currency module to distribute amounts of virtual currency to the character for participation and/or success in primary objectives based on the amount of fans in the character's fanbase. The fanbase impact module may be configured to provide the character with other opportunities to earn dispersals of virtual currency to the character that leverage the popularity of the character in a realistic manner.

The fanbase impact module may be configured such that opportunities for the character to enter and/or enhance relationships within the videogame are impacted by the fanbase of the character. For example, the character may be able to enter and/or enhance relationships with other characters in the game if the fans in the fanbase of the character make the character a more desirable ally or friend. As another example, the character may receive opportunities to join teams and/or formal alliances based, at least in part, on his fanbase.

The fanbase impact module may be configured such that sponsorship opportunities may be presented to the character based on the fans in the fanbase of the character. The sponsorships may include sponsorships of fictional entities and/or organizations within the videogame. The sponsorships may result in the character receiving virtual currency, equipment or other virtual items, the opportunity to purchase equipment and/or other virtual items, and/or other compensation for the character.

The fans in the fanbase of the character may be virtual fans. These fans may be simply represented by the fanbase module as an amount. In such instance, the impact of the fanbase determined by the fanbase impact module may be based on the amount of fans in the fanbase. However, the virtual fans in the fanbase may be modeled by the fanbase module as individual virtual characters or sets of characters. Such virtual characters may each have individual influences and/or characteristics in the videogame. The fanbase impact module may be configured to determine the impact of the fanbase based on these specific traits, influences, and/or characteristics of the fans that have been earned by the character. For example, if the fanbase includes fans that have a disproportionate demographic similarity, this demographic similarity may influence the impact of the fanbase determined by the fanbase impact module. As another example, if the fanbase includes virtual fans that are characters within the videogame that have disproportionate influence with respect to other characters, this disproportionate influence may be taken into account by the fanbase impact module in determining the impact of the fanbase.

Although the assignment of fans has been discussed with respect to purely virtual fans, this is not intended to be limiting. The fan objective evaluation module and/or fanbase 36 may be configured to assign characters associated with real life people to be fans of another character based on the other characters performance of one or more fan objectives.

It will be appreciated that the earning fans based on the performance of fan objectives is not intended to be limiting. For example, fans may be earned by a character based on performance in primary objectives as well as (and/or instead of) in the fan objectives staged within the primary objectives.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
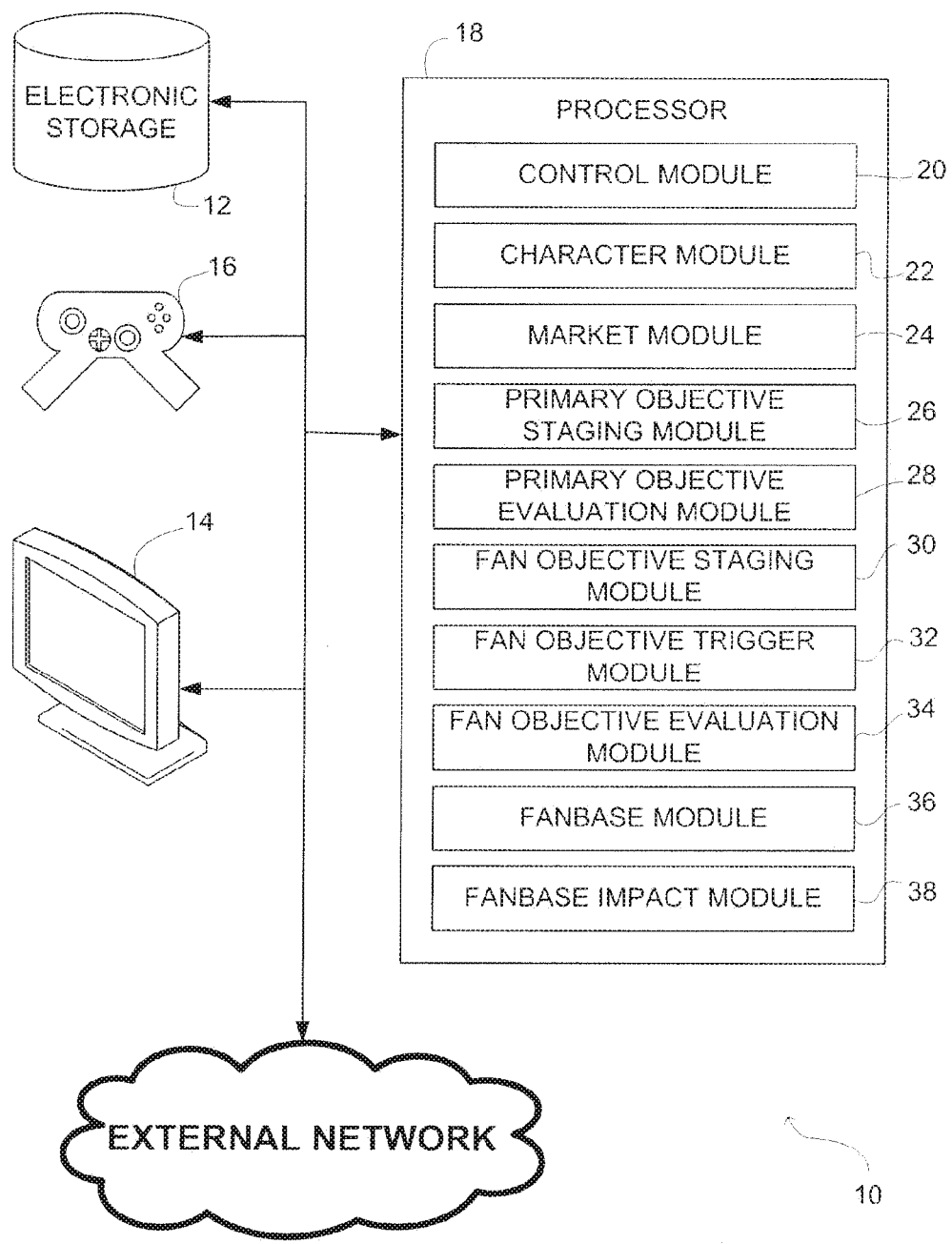
FIG. 1 illustrates a system configured to provide a videogame to one or more users, in accordance with one or more embodiments of the invention.

FIG. 1 illustrates a system 10 configured to provide a videogame to one or more users. The videogame may include one or more primary objectives presented to the user. The performance of the primary objectives by the user may impact the progression of a character being controlled by the user through the videogame. The videogame may further include provide one or more fan objectives within the game which can be performed by the character being controlled by the user to earn fans to be included within a fanbase associated with the character in the game. The fans may include virtual fans and/or fans associated with real life people (e.g., other users, people observing the user play the videogame, and/or other people). The number of fans in the fanbase of the character may impact the character within the game in a manner similar to the impact of fanbases in real life. For example, a character may earn virtual currency, be invited to participate in events and/or teams, obtain sponsorships, and/or experience other impacts associated with fanbase size. The system 10 may include one or more of electronic storage 12, an electronic display 14, a controller 16, one or more processors 18, and/or other components.

The system 10 may include a game console, such as Xbox 360® game console, the PlayStation3® game console, the Wii® game console, and/or other game consoles. This is not intended to be limiting. In some implementations, system 10 may include one or more other consumer computing platforms, such as, a desktop computer, a laptop computer, a handheld computer, a personal gaming device, a NetBook, a SmartPhone, and/or other computing platforms.

Electronic storage 12 may comprise electronic storage media that electronically stores information. The electronic storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor 18, information received via controller 16, and/or other information that enables system 10 to function properly. Electronic storage 12 may be a separate component within system 10, or electronic storage 12 may be provided integrally with one or more other components of system 10 (e.g., processor 18).

The electronic display 14 may be configured to generate a visual display of views rendered by processor 18 and/or other components of system 10. The electronic display 14 may include one or more of a television, a monitor, a touchscreen, a projection screen and/or projector, and/or other electronic displays. Although electronic display 14 is illustrated in FIG. 1 as a single component, in some implementations electronic display 14 may include a plurality of separate displays cooperating to generate visual displays rendered by system 10 to provide the videogame to the user.

In some implementations, electronic display 14 may be associated with one or more sound production devices (e.g., speakers, amplifiers, and/or other sound production devices). The sound production devices (not shown) may be configured to produce sounds in accordance with the videogame and/or in coordination with the visual displays generated by electronic display 14. The one or more sound production devices may be provided integrally with electronic display 14 and/or separately from electronic display 14. The one or more sound production devices may be in operative communication with electronic display 14 and/or processor 18 to receive signals dictating the sounds generated by the sound production devices.

The controller 16 may be configured to enable a user to input control inputs to system 10. This may enable the user to control one or more aspects of the videogame being provided to the user by system 10, to control operation of one or more of the components of system 10 (e.g., power, volume, brightness, and/or other aspects of operation), and/or provide other types of interaction between the user and system 10. In order to enable the input of control inputs, controller 16 may include one or more of a switch, a button a knob, a lever, an analog stick, a position, velocity, and/or acceleration detector, a direction pad, a microphone, a keypad, a number pad, and/or other devices enabling the input of control inputs by the user. The controller 16 may include one or more feedback devices through which information is communicated to the user from system 10. By way of non-limiting example, controller 16 may include a tactile feedback device, a sound generating device, a visual display generating device, and/or other feedback devices. The controller 16 may be operatively linked for communication with one or more of electronic storage 12, electronic display 14, processor 18, and/or other components of system 10.

Processor 18 is configured to provide information processing capabilities in system 10. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device, or processor 18 may represent processing functionality of a plurality of devices operating in coordination.

As is shown in FIG. 1, processor 18 may be configured to execute one or more computer program modules. The one or more computer program modules may include one or more of a control module 20, a character module 22, a market module 24, a primary objective staging module 26, a primary objective evaluation module 28, a fan objective staging module 30, a fan objective trigger module 32, a fan objective evaluation module 34, a fanbase module 36, a fanbase impact module 38, and/or other modules. Processor 18 may be configured to execute modules 20, 22, 24, 26, 28, 30, 32, 34, 36, and/or 38 by software; hardware; firmware; some combination of software, hardware, and/or firmware; and/or other mechanisms for configuring processing capabilities on processor 18.

It should be appreciated that although modules 20, 22, 24, 26, 28, 30, 32, 34, 36, and 38 are illustrated in FIG. 1 as being co-located within a single processing unit, in implementations in which processor 18 includes multiple processing units, one or more of modules 20, 22, 24, 26, 28, 30, 32, 34, 36, and/or 38 may be located remotely from the other modules. The description of the functionality provided by the different modules 20, 22, 24, 26, 28, 30, 32, 34, 36, and/or 38 described below is for illustrative purposes, and is not intended to be limiting, as any of modules 20, 22, 24, 26, 28, 30, 32, 34, 36, and/or 38 may provide more or less functionality than is described. For example, one or more of modules 20, 22, 24, 26, 28, 30, 32, 34, 36, and/or 38 may be eliminated, and some or all of its functionality may be provided by other ones of modules 20, 22, 24, 26, 28, 30, 32, 34, 36, and/or 38. As another example, processor 18 may be configured to execute one or more additional modules that may perform some or all of the functionality attributed below to one of modules 20, 22, 24, 26, 28, 30, 32, 34, 36, and/or 38.

The control module 20 may be configured to enable a user to control one or more objects within views displayed on electronic display 14 by virtue of control inputs input to system 10 via controller 16. For example, the one or more objects that are controllable by virtue of control module 20 may include one or more of an avatar associated with a character, a vehicle, vessel, and/or aircraft associated with a character, a weapon being manipulated and/or used by a character, and/or other objects. To accomplish this control, control module 20 may translate control inputs received via controller 16 into movements, actions, activities, maneuvers, and/or motions to be performed by the object(s) being controlled.

The character module 22 may be configured to manage information related to characters within the videogame. The characters for which information is managed by character module 22 may include characters that are played and/or playable by users. The management of information by character module 22 may include storing character profiles that correspond to individual characters to electronic storage 12. The character profile corresponding to a given character may include character information related to the given character. The character information may include, for example, one or more of user information, character progress information, character inventory information, character skill information, character appearance information, character relationship information, and/or other information.

User information associated with a character may include information identifying a user that has access to the character to play the character in the videogame. The user information may be implemented within system 10 to provide the user with access to the character (e.g., at initiation of a gaming session).

Character progress information may include information related to the progress of the character through the videogame. This may include information specifying content that has been successfully completed, content that is "unlocked" and/or "unlocked" for the character, objectives previously completed by the character, a current progress with respect to one or more objectives in the videogame, score information, record scores or times for the character, and/or other information related to the progress of the character through the videogame.

Character inventory information may include information related to items currently "possessed" and/or "carried" by the character. Items that are possessed may include any and all items that are at the selective disposal of the character. Items that are carried by the character may include some and/or all of the items that are at the selective disposal of the character at a specific point in time. As such, one or more items "possessed" by the character may not be currently "carried." Items that may be possessed and/or carried by the character within the videogame may include, for example, clothing and shoes, vehicles, vessels, and/or aircraft, weapons, tokens, potions, food, virtual currency, armor, tools, explosives, fuel, and/or other items.

Character skill information may include information related to the skill level of the character with respect to one or more skills in the videogame. Such skill levels may be earned, bought, traded, received as a given, gained through game progression, and/or otherwise acquired and/or leveled up.

Character appearance information may define one or more aspects of an appearance of the character. Such aspects may be related to clothing, armor, weapons, vehicles, and/or other items currently being used, worn, and/or carried by the character. Such aspects may be related to a physical appearance of the characters body. One or more aspects of the appearance of the character may be customizable by the user playing the videogame as the character.

Character relationship information may be related to relationships between the character and other entities within the videogame. The other entities may include, for example, other characters, a team, a sponsor (e.g., a fictional sponsor within the game), a racing circuit, a club, and/or other entities in the videogame.

The market module 24 may be configured to support a marketplace within the videogame. The marketplace may enable the character to purchase and/or trade for virtual goods and/or services within the videogame. The virtual goods and/or services may be purchased or traded for with other characters and/or entities controlled by other users, and/or with characters and/or entities that are not controlled by other users. Characters or entities that are not controlled by other users may include characters or entities that are controlled automatically within the videogame (e.g., controlled by artificial intelligence, controlled according to a predetermined algorithm, and/or otherwise automatically controlled), and/or characters or entities that are controlled by the provider of the videogame (e.g., a publisher, a developer, a first-party, and/or videogame providers).

In purchasing and/or trading for virtual goods and/or services within the videogame, the character may use virtual currency, real life currency, and/or items within the inventory corresponding to the character. The marketplace may include one or more virtual locations within the videogame set up to enable the character to make transactions, or the marketplace may enable the character to make some or all transactions throughout the videogame without respect for location within the game.

The primary objective staging module 26 may be configured to stage an event having a primary objective within the videogame. By way of non-limiting example, an event having a primary objective may include one or more of a race, a puzzle, a fight, a battle, a contest, and/or other events involving primary objectives. In implementations in which the videogame includes a racing game, primary objective staging module 26 may be configured to stage races in which vehicles are raced through a virtual racecourse. Staging a race may include rendering views of the racecourse that include the vehicles participating in the race. The rendered views may depict the vehicle controlled by a character associated with a user using controller 16 travelling through the racecourse in accordance with the control inputs input to system 10 by the user via controller 16.

The primary objective evaluation module 28 may be configured to evaluate the performance of the character in executing the primary objective. In a race staged by primary objective staging module 26, the primary objective may include finishing the race, finishing at or above a predetermined place in the race, minimizing the amount of time spent finishing the race, beating one or more predetermined opponents, and/or other objectives. The primary objective evaluation module 28 may be configured to monitor the character during the race to determine whether the character has completed the primary objective and/or to evaluate the performance of the character during the race. In implementations in which the videogame is not a racing game, and primary objective staging module 26 stages a primary objective that is not a race, primary objective evaluation module 28 may monitor the character's performance of other types of primary objectives to evaluate performance.

The fan objective staging module 30 may be configured to stage a plurality of fan objectives that are selectably performable by the character during a given primary objective (e.g., a race) staged by primary objective staging module 26. Fan objectives may be secondary objectives that can be performed during performance of a primary objective. Performance of a fan objective by the character may result in the character earning fans within the videogame to be included in the character's fanbase. The fans may include virtual fans and/or real life fans.

Staging a fan objective may include presenting the fan objective for performance. This may include inserting a fan objective icon into views of a primary objective rendered by primary objective staging module 26, and associating a fan objective with the fan objective icon. The fan objective icon may give some indication of what the associated fan objective entails, or the fan objective icon may be generic between fan objectives.

Figure 2:
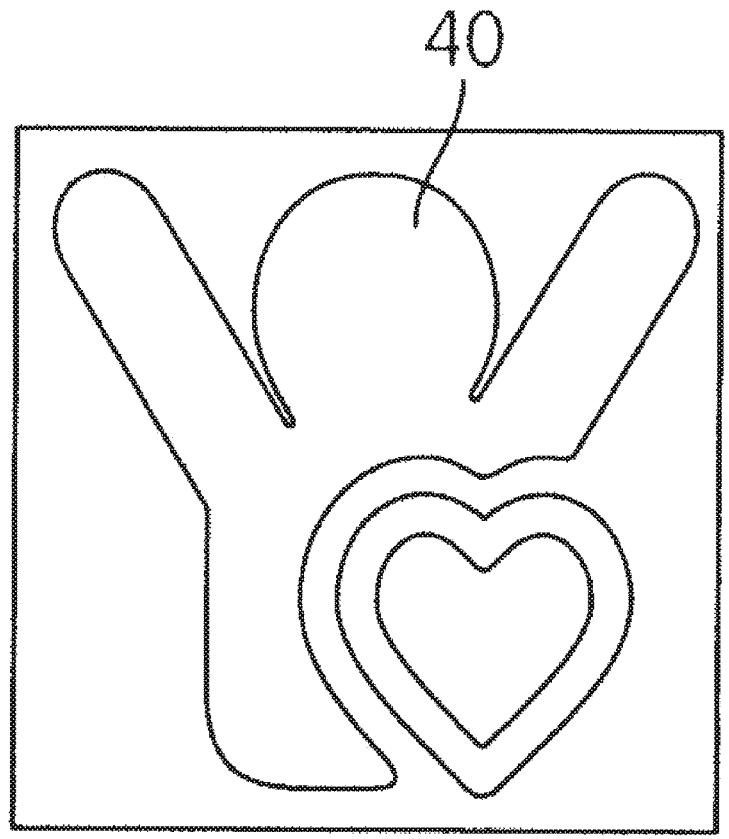
FIG. 2 illustrates a fan objective icon, according to one or more embodiments of the invention.
Figure 3:
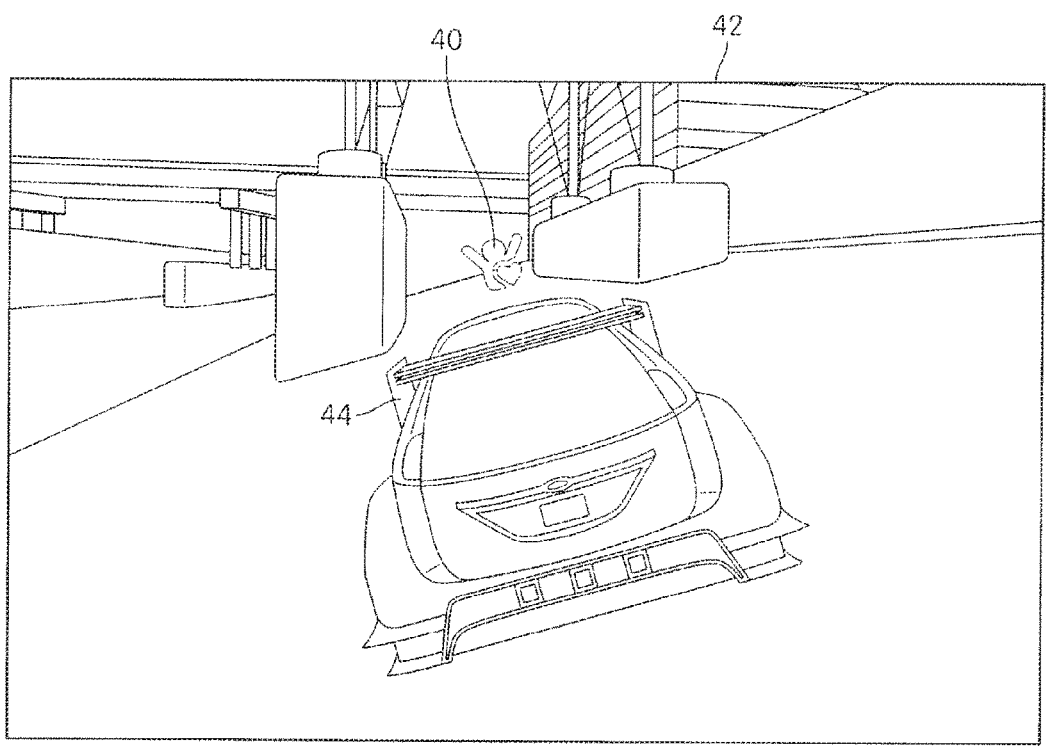
FIG. 3 illustrates a view of a primary objective within a videogame, according to one or more embodiments of the invention.

By way of illustration, FIG. 2 shows an exemplary fan objective icon 40. It will be appreciated that the depiction of fan objective icon 40 is not intended to be limiting. By way of further illustration, FIG. 3 shows fan objective icon 40 inserted into a view 42 of a primary objective. In the implementations illustrated in FIG. 3, the primary objective includes a car race through which a vehicle 44 associated with a character is controlled by a user. In such implementations, the fan objective associated with fan objective icon 40 may include one or more of a point-to-point objective, a maneuver objective, a pickup objective, a racer interaction objective, a damage objective, and/or other objectives.

A point-to-point objective may involve controlling the vehicle to travel from a beginning location to one or more other designated locations. The beginning location may be the location at which the fan objective icon 40 is located within the views of the videogame. The other designated locations may include locations that are specially marked, specific locations that are specifically described to the user (e.g., drive under a crane), locations that satisfy some criteria provided to the user (e.g., flat ground, outside of a building, and/or other criteria), and/or other locations. The designated location may be fixed, or may be moving (e.g., drive through a break in a moving set of objects, hit a moving object, and/or other moving locations).

A maneuver objective may involve performing one or more specified maneuver(s) with the vehicle. By way of non-limiting example, the one or more specified maneuvers may include one or more of a jump, a nitro jump, a drifted corner, a powerslide, jumping a designated object or location, jumping to a designated object or location, passing one or more other vehicles, attaining a specified speed, performing a corner or jump with an evaluated level of efficiency and/or effectiveness, and/or other maneuvers.

A pickup objective may involve driving over or near one or more specified "pickups." The one or more "pickups" may be specified by type, by location and/or both. As used herein, the term "pickup" may refer to a power, resource, or advantage that is obtained by the character when vehicle 44 drives over or near an icon associated with the power, resource, and/or advantage.

A racer interaction objective may involve effectively interacting with one or more other racers in a predetermined manner. For example, a racer interaction objective may include using a pickup to harm and/or help one or more other racers. As another example, a racer interaction objective may include crashing into one or more other racers, causing one or more other racers to crash, and/or otherwise interacting with other racers during a race.

A damage objective may involve causing predetermined damage. The damage may be to one or more inanimate objects on or near the racecourse, one or more other racers, and/or other objects on or near the racecourse.

It will be appreciated that this is not intended to be an exhaustive list of the types of fan objectives that may be implemented. Other types are contemplated. In some instances, a given fan objective may be a hybrid of two or more types of fan objective. For example, the given fan objective may specify a type of pickup to be made during a specified type of maneuver (e.g., a jump).

Performance or non-performance of fan objectives during performance of a primary objective may not directly impact the performance of the primary objective by the primary character. For example, with respect to FIG. 2, controlling vehicle 44 to perform a fan objective may not directly impact the relative position or speed of vehicle 44 in the race. As such, fan objectives may be peripheral, or parallel to the primary objective in which they are staged.

Returning to FIG. 1, the fan objectives staged by fan objective staging module 30 may be graduated according to difficulty. For example, the fan objectives may include a first set of fan objectives, a second set of fan objectives, and/or a third set of an objectives that are of an increasing difficulty level (e.g., the first set is easiest, the third set is hardest). The fan objective staging module 30 may be configured such that not every character will be presented with all of the fan objectives during a given primary objective. Some of the fan objectives may be left out of the given primary objective because they are too hard and/or too easy of the character. Determinations of whether to leave fan objectives out of the given primary objective may be made based on, for example, a difficulty setting for the videogame as a whole selected by the user associated with the character.

Figure 4:
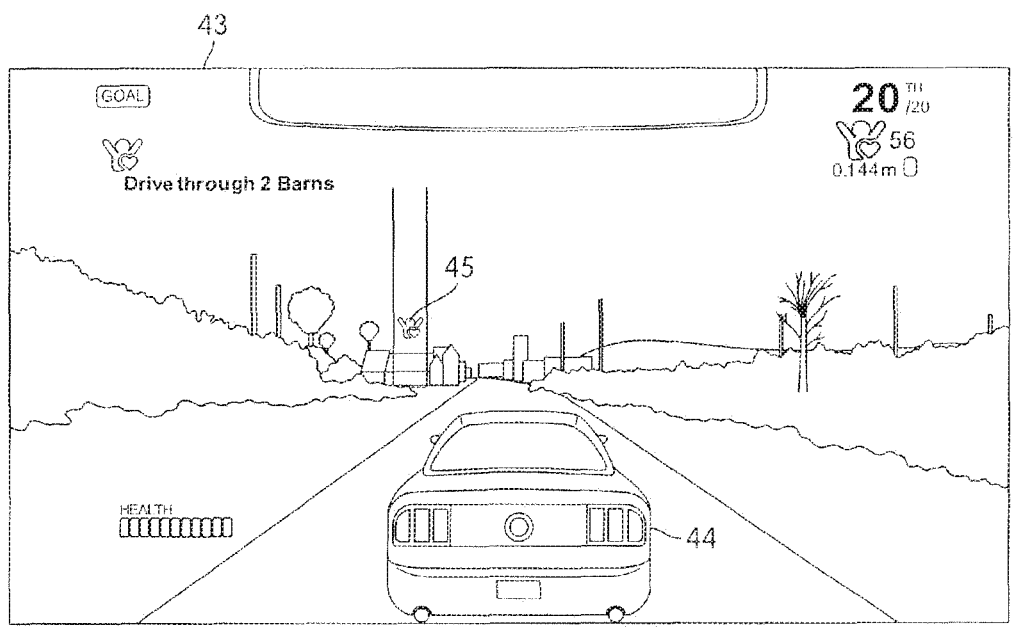
FIG. 4 illustrates a view of a primary objective within a videogame along with a visual indicator the corresponds to a fan objective, according to one or more embodiments of the invention.

Staging a fan objective may include presenting to the user one or more indicators that guide the user through performance of the fan objective. The one or more indicators may include visual clues that guide the user via position, shape, symbology, color, and/or other characteristics that convey messages to the user about performance of the fan objective. For example, FIG. 4 shows a view 43 of a racing videogame in which an indicator 45 is provided that guides the user through performance of a fan objective. In view 43, indicator 45 may indicate a location at which the user will be able to perform the fan objective. For example, if the fan objective includes maneuvering through a specific object (e.g., the highlighted barn doors), indicator 45 may highlight view 43 so that the user can more easily spot where to go to perform the fan objective.

The fan objective trigger module 32 may be configured to trigger activation of fan objectives. Activation of fan objectives may be triggered based on performance of one or more triggering maneuvers by a character. For example, in a racing videogame, a triggering maneuver may include maneuvering a vehicle associated with the character over or through a fan objective icon (e.g., such as fan objective icon 40 shown in FIG. 2 and described above).

Figure 5:
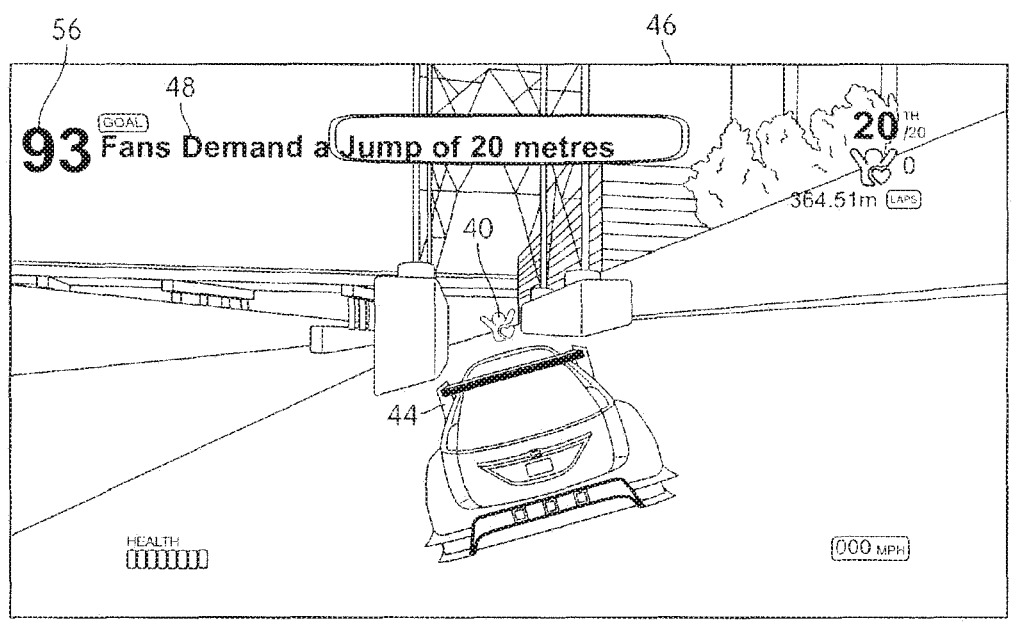
FIG. 5 illustrates a view of a primary objective within a videogame, according to one or more embodiments of the invention.

Once a fan objective is activated by fan objective trigger module 32, the fan objective may remain active until it is completed, until a time period associated with the fan objective runs out, and/or until some other event. At activation of the fan objective, information about the fan objective may be conveyed to the user corresponding to the character. This may include providing such information to the user via the views of the racecourse by electronic display 14. By way of illustration, FIG. 5 illustrates a view 46 of a racing videogame in which a fan objective has been activated. Via view 46, a description 48 of the fan objective is presented to the user.

Figure 6:
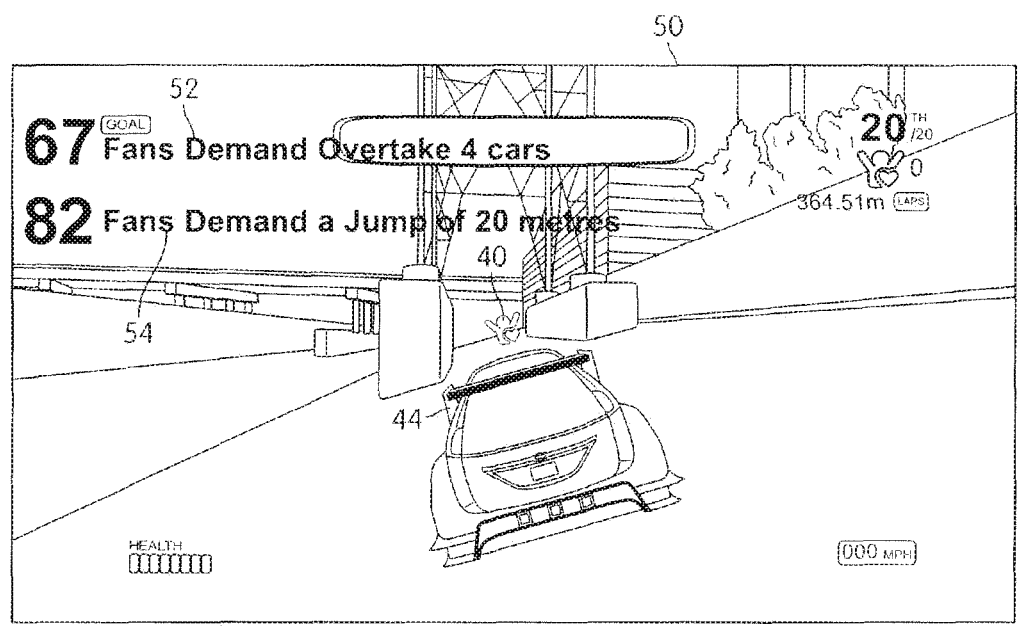
FIG. 6 illustrates a view of a primary objective within a videogame, according to one or more embodiments of the invention.

While a first fan objective is active, the character (and/or the vehicle associated with the character) may perform a triggering maneuver associated with a second fan objective. The triggering maneuver associated with the second fan objective may result in the activation of the second fan objective. For example, FIG. 6 illustrates a view 50 of a racing videogame in which triggering of a first and a second fan objective has resulted in a first description 52 of the first fan objective and a second description 54 of the second fan objective being displayed in view 50.

Returning to FIG. 1, there may be a maximum number of currently activated fan objectives. In such instances, performance of a triggering maneuver when fan objective trigger module 32 has already triggered activation of the maximum number of currently activated fan objectives may result in the fan objective associated with the triggering maneuver not being triggered. In some instances, performance of a triggering maneuver when fan objective module 32 has already triggered activation of the maximum number of currently activated fan objectives may result in one of the previously activated fan objectives being expired so that the fan objective associated with the triggering maneuver can be triggered by fan objective trigger module 32. In some instances, performance of a triggering maneuver when fan objective trigger module 32 has already triggered activation of another fan objective may result in the fans associated with performance one of the triggered fan objectives being transferred to the other fan objective.

The manner in which multiple triggered fan objectives are handled may be based in part on the difficulty level of the triggered fan objectives. For example, a newly triggered fan objective having a relatively high difficulty level may result in the expiration of a previously triggered fan objective with a relatively low difficulty level. As another example, a newly triggered fan objective having a relatively low difficulty level may result in the fans associated with performance of the newly triggered fan objective being transferred to a previously triggered fan objective such that performance of the previously triggered fan objective results in the character being awarded with the fans associated with both of the triggered fan objectives.

The fan objective evaluation module 34 may be configured to evaluate the performance of the fan objectives by the character. This may include monitoring performance of the fan objectives by the character. Upon completion of a fan objective by the character, fan objective evaluation module 34 may determine a number of fans earned by the character by virtue of the completed fan objective. The number of fans earned by the character may include a number of fans previously assigned to the fan objective, and/or the fans earned by the character may be determined by fan objective evaluation module 34 based on the performance of the character in completing the fan objective.

In some implementations, fan objective evaluation module 34 determines the number of fans earned by the character by virtue of a completed fan objective based on an amount of time that the completed fan was active (e.g., between triggering and completion). The number of fans earned by the character may be inversely proportional to the amount of time that the completed fan objective was active.

The fan objective evaluation module 34 may be configured to provide feedback to the user controlling the character that indicates to the user an amount of fans that could be earned by completing the fan objectives. By way of illustration, turning back to FIG. 5, an indication 56 may be included in view 46 that indicates the amount of fans that could be earned by completing the fan objective described in description 48. The number of fans indicated in indication 56 decays as time passes. Thus, the longer it takes for vehicle 44 to complete the fan objective, the fewer the number of fans that will be earned. The decay of the number of fans indicated in indication 56 may begin immediately upon triggering of the fan objective, or the decay may be delayed by a delay period. The rate at which the number of fans indicated in indication 56 decays may be constant with respect to time, or may accelerate or decelerate as time goes on. The delay period and/or the decay rate may be determined based on a level of difficulty of the fan objective.

Returning to FIG. 1, the fan objective evaluation module 34 may be configured such that after a predetermined period of time from triggering of a fan objective, the fan objective expires. Upon expiration of the fan objective, performance of the fan objective by the character may no longer result in an award of fans to the character. The predetermined period of time may be based on a level of difficulty of the triggered fan objective.

The fan objective evaluation module 34 may be configured such that once accomplishment of a fan objective can be ruled out (e.g., because performance would be impossible, improbable, and/or counterproductive), the fan objective expires. For instance, in a racing game, if the user maneuvers into an area in which an activity associated with the fan objective becomes impossible, the fan objective expires. By way of illustration, if the fan objective includes jumping over a specific object, and the user drives past the object, the fan objective may expire due to impossibility. In this example, the area past the object may be considered by the fan objective evaluation module to be a "fail zone" associated with the fan objective. If the user maneuvers into a fail zone associated with a fan objective, then the fan objective may expire.

The fanbase module 36 may be configured to determine the number of fans in the fanbase of a character in the videogame. The fanbase module 36 may determine the number of fans in the fanbase of the character based on determinations of fan awards by fan objective evaluation module 34. For example, fanbase module 36 may add a new award of fans to the fans previously acquired by the character to determine the number of fans in the fanbase of the character.

In some implementations, fanbase module 36 may be configured such that fans can be lost by the character. Fans may be lost over time, stolen by other characters, and/or otherwise lost. For example, if the character is not active in participating in primary objectives, attempting to earn new fans through the performance of fan objectives, and/or otherwise inactive and/or unsuccessful within the game, the interest of fans may be lost and the number of fans in the fanbase of the character may begin to decay. This decay may be determined according to a predetermined scheme that rewards a user controlling the character to maintain a certain level of activity and/or success within the videogame.

In some cases, fanbase module 36 may be configured such that fans may be stolen from the character by other characters (e.g., and vice versa). For example, if the character is outperformed by another one of the characters in a primary objective and/or a fan objective by a predetermined amount, the other character may steal some of the fans of the character. As another example, the videogame may be configured such that one character can challenge another character (or set of characters) to perform a competitive challenge objective. Fans may be exchanged between the characters that participate in the competitive challenge objective based on their relative performances in the competitive challenge objective. The number of fans that are exchanged may be based on a predetermined scheme, based on the difference between the performances of the participating characters (e.g., a close loss would result in fewer fans switching than a contest that was not close), based on an agreement between the participating characters (e.g., a wager of fans), and/or otherwise determined.

Fanbase module 36 may be configured to track the fanbases of various characters relative to each other. For example, fanbase module 36 may maintain a leaderboard or ranking of characters associated with different users that is based on the relative number of fans in the fanbases of the different characters. Such leaderboards and/or rankings may further be maintained for amounts of fans earned in specific primary objectives and/or sets of primary objectives.

The fanbase impact module 38 may be configured to determine the impact of the fanbase of a character on the arch of the character within the videogame. The fanbase impact module 38 may determine this impact based on the number of fans in the fanbase of the character. The fanbase impact module 38 may be configured such that the fans in the fanbase of the character may be similar to the impact of fanbases in the real world. For example, opportunities to participate in primary objectives, distribution of virtual currency, relationships with other characters and/or entities within the videogame, sponsorship opportunities, and/or other aspects of the videogame may be impacted by the number of fans in the fan base of the character.

The staging of primary objectives by primary objective staging module 26 may include determining whether the character should be invited to participate in a given primary objective. In real life, the number of fans in a fanbase of a racer may impact the opportunities to race received by the racer. The more popular the racer is, the more races he may be asked to participate in, and the more prestigious the races may be. In a racing videogame, fanbase impact module 38 may be configured to mimic this impact of a fanbase such that in staging races, primary objective staging module 26 may extend, or not extend, invitations to race to the character based on the amount of fans (and/or other characteristics of the fans) in the fanbase of the character.

In real life, the popularity associated with having a relatively large fanbase may enable someone to earn additional money. For example, a popular participant in events may earn appearance fees for participation, may gain entrée to events in which prize money is relatively high, and/or may otherwise leverage their popularity to earn additional money. The fanbase impact module 38 may be configured to mimic this impact in the videogame. For example, system 10 may include a virtual currency module (not shown) configured to distribute virtual currency to the character. The fanbase impact module 38 may be configured to cause the virtual currency module to distribute amounts of virtual currency to the character for participation and/or success in primary objectives based on the amount of fans in the character's fanbase. The fanbase impact module 38 may be configured to provide the character with other opportunities to earn dispersals of virtual currency to the character that leverage the popularity of the character in a realistic manner.

The fanbase impact module 38 may be configured such that opportunities for the character to enter and/or enhance relationships within the videogame are impacted by the fanbase of the character. For example, the character may be able to enter and/or enhance relationships with other characters in the game if the fans in the fanbase of the character make the character a more desirable ally or friend. As another example, the character may receive opportunities to join teams and/or formal alliances based, at least in part, on his fanbase.

The fanbase impact module 38 may be configured such that sponsorship opportunities may be presented to the character based on the fans in the fanbase of the character. The sponsorships may include sponsorships of fictional entities and/or organizations within the videogame. The sponsorships may result in the character receiving virtual currency, equipment or other virtual items, the opportunity to purchase equipment and/or other virtual items, and/or other compensation for the character.

The fans in the fanbase of the character may be virtual fans. These fans may be simply represented by fanbase module 36 as an amount. In such instance, the impact of the fanbase determined by fanbase impact module 38 may be based on the amount of fans in the fanbase. However, the virtual fans in the fanbase may be modeled by fanbase module 36 as individual virtual characters. Such virtual characters may each have individual influences and/or characteristics in the videogame. The fanbase impact module 38 may be configured to determine the impact of the fanbase based on these specific traits, influences, and/or characteristics of the fans that have been earned by the character. For example, if the fanbase includes fans that have a disproportionate demographic similarity, this demographic similarity may influence the impact of the fanbase determined by fanbase impact module 38. As another example, if the fanbase includes virtual fans that are characters within the videogame that have disproportionate influence with respect to other characters, this disproportionate influence may be taken into account by fanbase impact module 38 in determining the impact of the fanbase.

Although the assignment of fans has been discussed with respect to purely virtual fans, this is not intended to be limiting. The fan objective evaluation module 34 and/or fanbase module 36 may be configured to assign characters associated with real life people to be fans of another character based on the other characters performance of one or more fan objectives.

It will be appreciated that the mechanism for earning fans described above (e.g., the performance of fan objectives) is not intended to be limiting. For example, fans may be earned by a character based on performance in primary objectives as well as in the fan objectives staged within the primary objectives.

Figure 7:
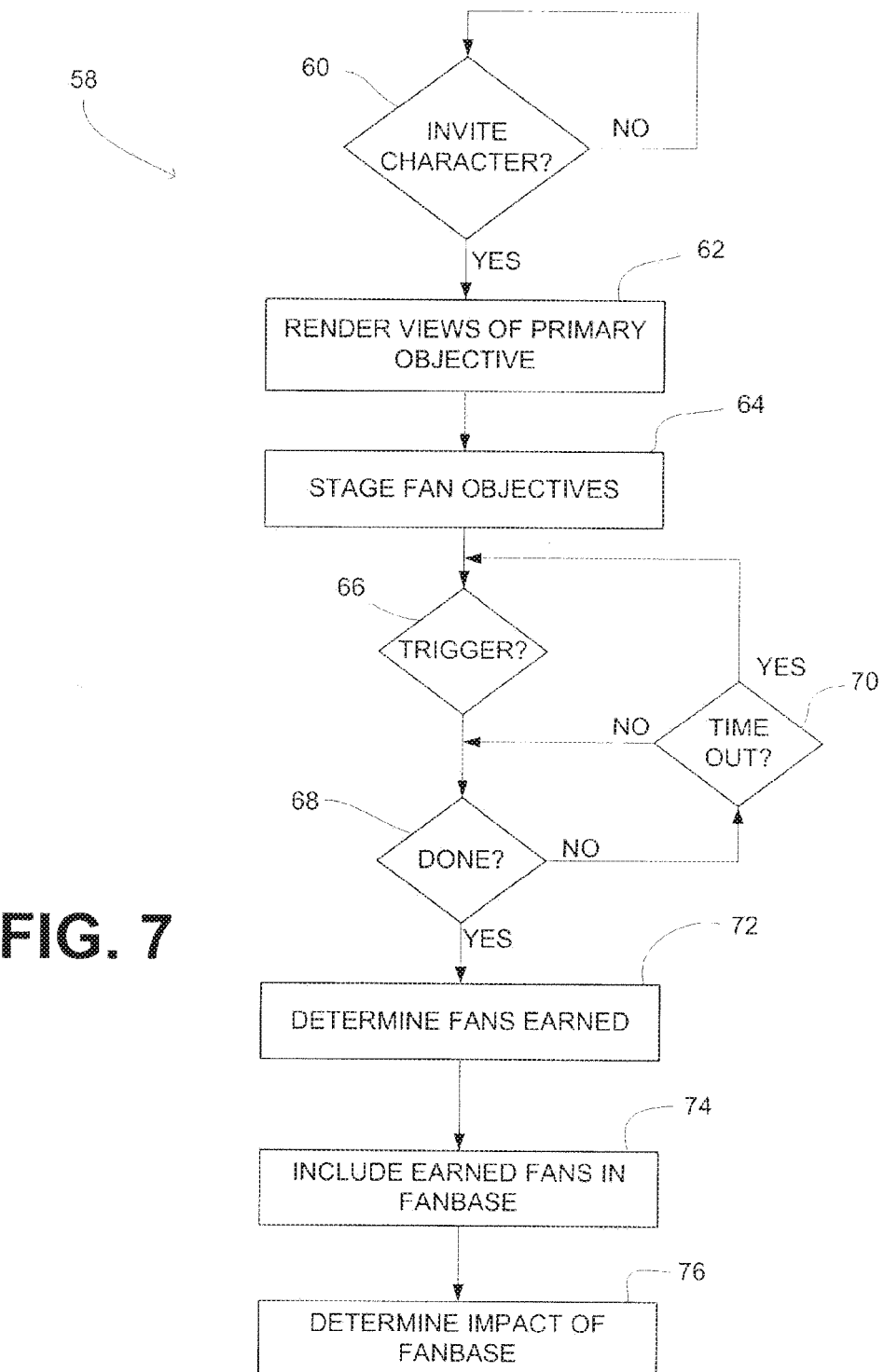
FIG. 7 illustrates a method of providing a videogame to one or more users, in accordance with one or more embodiments of the invention.

FIG. 7 illustrates a method 58 of providing a videogame to a user. The operations of method 58 presented below are intended to be illustrative. In some embodiments, method 58 may be accomplished with one or more additional operations not described, and/or without one or more of the operations discussed. Additionally, the order in which the operations of method 58 are illustrated in FIG. 7 and described below is not intended to be limiting.

In some embodiments, method 58 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 58 in response to instructions stored electronically on an electronic storage medium. The one or more processing devices may include one or more devices configured through hardware, firmware, and/or software to be specifically designed for execution of one or more of the operations of method 58.

As a part of method 58, a primary objective may be staged. The primary objective may include an event in which a primary objective may be attempted by a character being controlled by a user. The staging of the primary objective may include determining whether the character should be invited to participate in the primary objective at an operation 60. The determination as to whether the character should be invited may be based on a fanbase associated with the character. The fanbase may include virtual fans previously earned by the character. In some implementations, operation 60 may be performed by a primary objective staging module that is the same as or similar to primary objective staging module 26 (shown in FIG. 1 and described above).

At an operation 62, the staging of the primary objective continues as views of the primary objective are rendered for display to the user. In some implementations, operation 62 may be performed by a primary objective staging module that is the same as or similar to primary objective staging module 26 (shown in FIG. 1 and described above).

At an operation 64, one or more fan objectives may be staged within the primary objective. The fan objectives may be secondary objectives performable during the primary objective by the character to earn fans for the fanbase of the character. Staging the one or more fan objectives may include inserting one or more fan objective icons into the views of the primary objective, and associating individual ones of the fan objective icons with individual ones of the fan objectives. In some implementations, operation 64 may be performed by a fan objective staging module that is the same as or similar to fan objective staging module 30 (shown in FIG. 1 and described above).

At an operation 66, a determination may be determined as to whether or not a fan objective has been triggered. In some implementations, operation 66 may be performed by a fan objective trigger module that is the same as or similar to fan objective trigger module 32 (shown in FIG. 1 and described above).

If a fan objective has been triggered at operation 66, then performance of the triggered fan objective may be monitored and/or evaluated. For example, responsive to a determination at operation 66 that the fan objective has been triggered, method 58 may proceed to an operation 68. At operation 68, a determination may be made as to whether the fan objective has been completed. In some implementations, operation 68 may be performed by a fan objective evaluation module that is the same as or similar to fan objective evaluation module 34 (shown in FIG. 1 and described above).

If a determination is made at operation 68 that the fan objective has not been completed, method 58 may proceed to an operation 70. At operation 70, a determination may be made as to whether a time period allotted for the fan objective to be performed as expired. In some implementations, operation 70 may be performed by a fan objective evaluation module 34 that is the same as or similar to fan objective evaluation module 34 (shown in FIG. 1 and described above).

If a determination is made at operation 70 that the time period allotted for the fan objective to be performed has expired, method 58 may return to operation 66. If a determination is made at operation 70 that the time period allotted for the fan objective to be performed has not expired, method 58 may return to operation 68.

Responsive to a determination at operation 68 that the character has performed the fan objective, method 58 may proceed to an operation 72. At an operation 72, an amount of fans earned by the character by virtue of the performance of the fan objective may be determined. In some implementations, operation 72 may be performed by a fan objective evaluation module that is the same as or similar to fan objective evaluation module 34 (shown in FIG. 1 and described above).

At an operation 74, the fans earned by the character at operation 72 may be added to the fanbase of the character. In some implementations, operation 74 may be performed by a fanbase module 36 that is the same as or similar to fanbase module 36 (shown in FIG. 1 and described above).

At an operation 76, an impact of the fanbase of the character on the videogame may be determined. In some implementations, operation 76 may be performed by a fanbase impact module that is the same as or similar to fanbase impact module 38 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a videogame to one or more users, the system comprising:

one or more processors configured to execute computer program modules, the computer program modules comprising:
a primary event staging module configured to stage an event in which a character under control of a controller communicatively linked with the one or more processors participates, wherein staging the event comprises
rendering views of the character engaging in the event; and
determining whether or not to invite the character to participate in the event; and
a fan objective staging module configured to stage a plurality of fan objectives, wherein fan objectives are secondary objectives performable during the event by the character to earn virtual fans for a virtual fanbase of the character, wherein staging a fan objective comprises inserting an objective icon into views of the event and associating the fan objective with the objective icon and wherein the objective icon comprises a visual indicator configured to provide guidance for the performance of the fan objective based on at least one of a position, a shape, a symbology, or a color of the objective icon;
a fan objective trigger module configured to trigger activation of fan objectives responsive to performance of one or more triggers executed by the character during the event; and
a fan objective evaluation module configured to monitor performance of one or more active fan objectives by the character, and upon completion of a fan objective by the character, to allocate a number of fans earned by the character by virtue of the completed fan objective based on the performance of the character in completing the fan objective; and
wherein the primary event staging module is further configured to determine whether or not to invite the character to participate in the event based on the number of virtual fans in the fanbase of the character.

2. The system of claim 1, wherein performance or non-performance of fan objectives during the event do not directly impact a performance or non-performance of a primary objective of the event.

3. The system of claim 1, wherein the fan objective evaluation module is configured to determine the number of fans earned by the character by virtue of the completed fan objective based on an amount of time that the completed fan objective was active.

4. The system of claim 3, wherein the fan objective evaluation module is configured to determine the number of fans earned by the character by virtue of the completed fan objective according to a function that makes the number of fans earned inversely proportional to the amount of time that the completed fan objective was active.

5. The system of claim 1, wherein the computer program modules further comprise a fanbase module configured to determine the number of virtual fans in the fanbase of the character based on the number of fans earned by the character in performing fan objectives during events.

6. The system of claim 5, wherein the fanbase module is further configured such that the number of virtual fans in the fanbase of the character decays over time.

7. The system of claim 1, wherein the computer program modules further comprise a virtual currency module configured to distribute virtual currency to the character, wherein the virtual currency is redeemable in the videogame to acquire equipment and wherein the amount of virtual currency distributed to the character by the virtual currency module is impacted by the number of virtual fans in the fanbase of the character.

8. The system of claim 1, wherein the fan objective staging module is configured such that different characters are presented with different fan objectives during the event.

9. The system of claim 1, wherein the fan objective staging module is configured to present no more than a maximum number of fan objectives.

10. The system of claim 9, wherein the fan objective staging module is configured to cause a previously activated fan objective to expire when the fan objective trigger module has already triggered activation of the maximum number of fan objectives.

11. The system of claim 1, wherein the fan objective evaluation module is configured to provide feedback to the one or more users indicative of the number of fans that could be earned by completing the fan objective.

12. A computer-implemented method of providing a videogame to one or more users, wherein the method is implemented in a computer system comprising one or more processors configured to execute one or more computer program modules, the method comprising:
   executing, on the one or more processors of the computer system, one or more computer program modules configured to:
      stage, using a primary event staging module, an event in which a character under control of a controller communicatively linked with the one or more processors participates, wherein staging the event further comprises
         rendering views of the character engaging in the event; and
         determining whether or not to invite the character to participate in the event; and
      staging, using a fan objective staging module, a plurality of fan objectives, wherein fan objectives are secondary objectives performable during the event by the character to earn virtual fans for a virtual fanbase of the character, wherein staging a fan objective comprises inserting an objective icon into views of the event and associating the fan objective with the objective icon and wherein the objective icon comprises a visual indicator configured to provide guidance for the performance of the fan objective based on at least one of a position, a shape, a symbology, or a color of the objective icon;
      triggering, using a fan objective trigger module, activation of fan objectives responsive to performance of one or more triggers executed by the character during the event;
      monitoring, using a fan objective evaluation module, performance of one or more active fan objectives by the character;
      allocating, upon completion of a fan objective by the character, a number of fans earned by the character by virtue of the completed fan objective based on the performance of the character in completing the fan objective; and
   wherein the primary event staging module is further configured to determine whether or not to invite the character to participate in the event based on the number of virtual fans in the fanbase of the character.

13. The method of claim 12, wherein performance or non-performance of fan objectives during the event do not directly impact a performance or non-performance of a primary objective of the event.

14. The method of claim 12, further comprising determining, using the fan objective evaluation module, the number of fans earned by the character by virtue of the completed fan objective based on an amount of time that the completed fan objective was active.

15. The method of claim 14, further comprising determining, using the fan objective evaluation module, the number of fans earned by the character by virtue of the completed fan objective according to a function that makes the number of fans earned inversely proportional to the amount of time that the completed fan objective was active.

16. The method of claim 12, further comprising determining, using a fanbase module, the number of virtual fans in the fanbase of the character based on the number of fans earned by the character in performing fan objectives during events.

17. The method of claim 16, wherein the fanbase module is further configured such that the number of virtual fans in the fanbase of the character decays over time.

18. The method of claim 12, further comprising distributing, using a virtual currency module, virtual currency to the character, wherein the virtual currency is redeemable in the videogame to acquire equipment and wherein the amount of virtual currency distributed to the character by the virtual currency module is impacted by the number of virtual fans in the fanbase of the character.

19. The method of claim 12, further comprising presenting, using the fan objective staging module, different fan objectives to different characters during the event.

20. The method of claim 12, further comprising presenting, using the fan objective staging module, no more than a maximum number of fan objectives.

21. The method of claim 20, further comprising causing, using the fan objective staging module, a previously activated fan objective to expire when the fan objective trigger module has already triggered activation of the maximum number of fan objectives.

22. The method of claim 12, further comprising providing, using the fan objective evaluation module, feedback to the one or more users indicative of an amount of fans that could be earned by completing the fan objective.

* * * * *